US008325847B2

(12) United States Patent
Dogan et al.

(10) Patent No.: US 8,325,847 B2
(45) Date of Patent: *Dec. 4, 2012

(54) METHOD AND APPARATUS FOR EFFICIENT STORAGE OF TRAINING SEQUENCES FOR PEAK TO AVERAGE POWER CONSTRAINED MODULATION FORMATS

(75) Inventors: Mithat C. Dogan, Sunnyvale, CA (US); Mitchell D. Trott, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 979 days.

This patent is subject to a terminal disclaimer.

(21) Appl. No.: 12/245,623

(22) Filed: Oct. 3, 2008

(65) Prior Publication Data

US 2010/0086078 A1      Apr. 8, 2010

Related U.S. Application Data

(63) Continuation of application No. 09/967,208, filed on Sep. 28, 2001, now Pat. No. 7,433,418.

(51) Int. Cl.
*H04L 27/00* (2006.01)

(52) U.S. Cl. .......... 375/295; 375/296; 332/106; 341/20; 341/173

(58) Field of Classification Search ................... 375/295
See application file for complete search history.

(56) References Cited

U.S. PATENT DOCUMENTS

| 6,445,747 B1 * | 9/2002 | Jafarkhani et al. ............ 375/285 |
| 6,650,714 B2 * | 11/2003 | Dogan et al. .................. 375/343 |
| 6,650,881 B1 * | 11/2003 | Dogan ........................ 455/276.1 |
| 6,651,210 B1 * | 11/2003 | Trott et al. .................... 714/758 |
| 6,842,487 B1 * | 1/2005 | Larsson ........................ 375/260 |

(Continued)

FOREIGN PATENT DOCUMENTS

EP   1187410 A1   3/2002

OTHER PUBLICATIONS

Tarokh, Vahid et al., "On the Computation and Reduction of the Peak-to-Average Power Ratio in Multicarrier Communications", Jan. 2000, IEEE Transactions on Communications, vol. 48, No. 1., (2000), 37-44 pps.*

*Primary Examiner* — David Ometz
*Assistant Examiner* — Santiago Garcia
(74) *Attorney, Agent, or Firm* — Blakely, Sokoloff, Taylor & Zafman LLP

(57) ABSTRACT

The present invention efficiently stores a training sequence in a communications system, where the training sequence exhibits certain desirable characteristics when used by a peak to average power constrained modulation format. In one embodiment, the invention includes selecting a set of one or more original ordered sequences such that the set of ordered sequences has at least one desired property, creating a set of extended sequences, each based on an original ordered sequence by beginning with an element of an original sequence, cyclically appending elements of the original sequence in order to obtain a desired extended sequence length, and modifying each extended sequence using a corresponding modifying sequence, such that a training sequence can be generated from any one of the modified extended sequences by beginning with any one element of any one modified extended sequence and taking each element of the any one sequence in order to obtain the training sequence, the modifying sequence being selected so that the obtained training sequence when modulated by a selected modulation format has the at least one desired property of the corresponding original ordered sequence.

17 Claims, 3 Drawing Sheets

U.S. PATENT DOCUMENTS

| | | | |
|---|---|---|---|
| 7,016,429 B1 * | 3/2006 | Dogan et al. | 375/279 |
| 7,020,828 B2 * | 3/2006 | Birru | 714/792 |
| 7,031,679 B2 * | 4/2006 | Persson et al. | 455/137 |
| 7,164,739 B1 * | 1/2007 | Trott | 375/347 |
| 7,433,418 B1 * | 10/2008 | Dogan et al. | 375/285 |
| 2003/0058926 A1 * | 3/2003 | Balakrishnan et al. | 375/146 |

* cited by examiner

METHOD AND APPARATUS FOR EFFICIENT STORAGE OF TRAINING SEQUENCES FOR PEAK TO AVERAGE POWER CONSTRAINED MODULATION FORMATS

This application is a continuation of U.S. patent application Ser. No. 09/967,208, filed Sep. 28, 2001, U.S. Pat. No. 7,433,418, entitled "Method and Apparatus for Efficient Storage of Training Sequences for Peak to Average Power Constrained Modulation Formats", the priority of which is hereby claimed.

BACKGROUND OF THE INVENTION

1. Field of the Invention

The present invention applies to the field of training sequences for communications systems and, in particular, to storing a training sequence having desirable correlation properties for peak to average power constrained modulation formats.

2. Description of the Prior Art

Communications systems such as cellular voice and data communication systems typically have several base stations available for use by several mobile or fixed user terminals, such as cellular telephones or wireless web devices. In such systems, base stations and user terminals typically communicate in data bursts. A burst may be a given time slot allocated to a user terminal in which it may communicate with the base station. For synchronization and calibration purposes, each burst includes a training sequence. The training sequence contains a known symbol set transmitted for quality control purposes. Since the data or symbol sequence is known, the characteristics of the received signal can be accurately measured and interpreted. Training sequences can be used for computing spatial and temporal filter weights at a base station in order to reduce intersymbol interference and co-channel interference, and increase the signal to noise ratio.

Two useful characteristics of well-designed training sequences are, first, that the training sequences of different users should be different, and second, that delayed training sequences of the same user should look different from the same training sequences received without delay. The first characteristic is enhanced if the absolute value of the cross correlations of the training sequences of any two users is kept as small as possible. The second characteristic is enhanced if the out of phase autocorrelations of the training sequence of any user are kept as small as possible.

Sequences with these desirable characteristics have been designed in the literature. Some of these sequences include Gold, Kasami, and Kerdock sequences. However, these sequences do not consider some of the practical aspects of modulation, such as maintaining a low peak to average power ratio (PAR). Modulation formats that are intended to reduce PAR can impair or destroy the desired correlation properties of the designed sequences.

BRIEF SUMMARY OF THE INVENTION

The present invention efficiently stores a training sequence in a communications system, where the training sequence exhibits certain desirable characteristics when used by a peak to average power constrained modulation format. In one embodiment, the invention includes selecting a set of one or more original ordered sequences such that the set of ordered sequences has at least one desired property, creating a set of extended sequences, each based on an original ordered sequence by beginning with an element of an original sequence, cyclically appending elements of the original sequence in order to obtain a desired extended sequence length, and modifying each extended sequence using a corresponding modifying sequence, such that a training sequence can be generated from any one of the modified extended sequences by beginning with any one element of any one modified extended sequence and taking each element of the any one sequence in order to obtain the training sequence, the modifying sequence being selected so that the obtained training sequence when modulated by a selected modulation format has the at least one desired property of the corresponding original ordered sequence.

Other features of the present invention will be apparent from the accompanying drawings and from the detailed description that follows.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Base Station Structure

Figure 1:
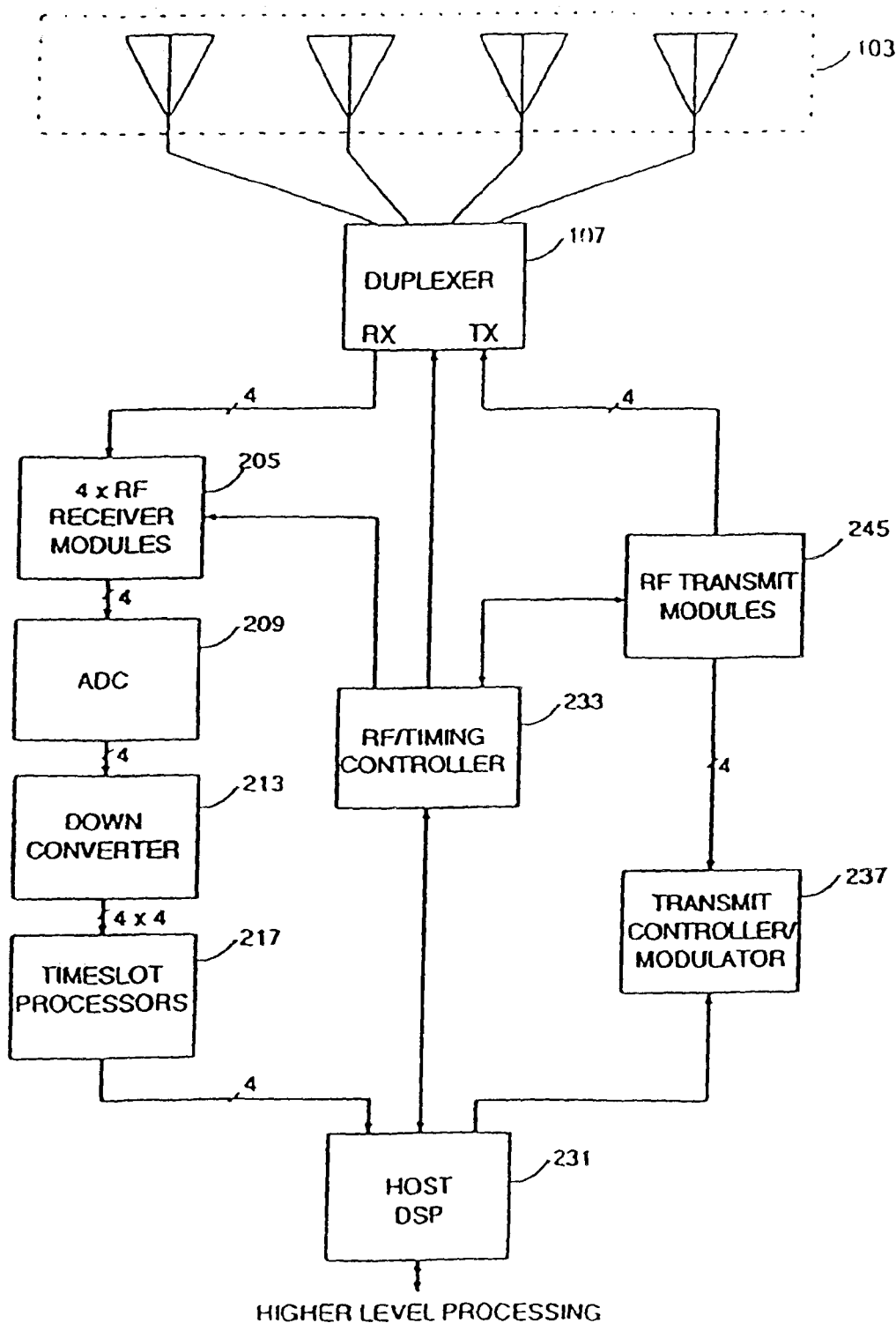
FIG. 1 is a simplified block diagram of a base station on which an embodiment of the invention can be implemented.

The present invention relates to communication systems and may be a fixed-access or mobile-access wireless network using spatial division multiple access (SDMA) technology in combination with other multiple access systems, such as time division multiple access (TDMA), frequency division multiple access (FDMA) and code division multiple access (CDMA). Multiple access can be combined with frequency division duplexing (FDD) or time division duplexing (TDD). FIG. 1 shows an example of a base station of a wireless communications system or network suitable for implementing the present invention. The system or network includes a number of subscriber stations, also referred to as remote terminals or user terminals, such as that shown in FIG. 2. The base station may be connected to a wide area network (WAN) through its host DSP 231 for providing any required data services and connections external to the immediate wireless system. To support spatial diversity, a plurality of antennas 103 is used, for example four antennas, although other numbers of antennas may be selected.

A set of spatial multiplexing weights for each subscriber station are applied to the respective modulated signals to produce spatially multiplexed signals to be transmitted by the bank of four antennas. The host DSP 231 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. Suitable smart antenna technologies for achieving such a spatially directed beam are described, for example, in U.S. Pat. No. 5,828,658, issued Oct. 27, 1998 to Ottersten et al. and U.S. Pat. No. 5,642,353, issued Jun. 24, 1997 to Roy, III et al.

The outputs of the antennas are connected to a duplexer switch 107, which in this TDD system is a time switch. Two possible implementations of switch 107 are as a frequency duplexer in a frequency division duplex (FDD) system, and as a time switch in a time division duplex (TDD) system. When receiving, the antenna outputs are connected via switch 107 to a receiver 205, and are mixed down in analog by RF receiver ("RX") modules 205 from the carrier frequency to an FM intermediate frequency ("IF"). This signal then is digitized (sampled) by analog to digital converters ("ADCs") 209. Only the real part of the signal is sampled. Final down-converting to baseband is carried out digitally. Digital filters can be used to implement the down-converting and the digital filtering, the latter using finite impulse response (FIR) filtering techniques. This is shown as block 213. The invention can be adapted to suit a wide variety of RF and IF carrier frequencies and bands.

There are, in the present example, four down-converted outputs from each antenna's digital filter device 213, one per receive timeslot. The particular number of timeslots can be varied to suit network needs. While the present example uses four uplink and four downlink timeslots for each TDD frame, desirable results have also been achieved with three timeslots for the uplink and downlink in each frame. For each of the four receive timeslots, the four down-converted outputs from the four antennas are fed to a digital signal processor (DSP) device 217 (hereinafter "timeslot processor") for further processing, including calibration, according to one aspect of this invention. Four Motorola 56300 Family DSPs can be used as timeslot processors, one per receive timeslot. The timeslot processors 217 monitor the received signal power and estimate the frequency offset and time alignment. They also determine smart antenna weights for each antenna element. These are used in the spatial diversity multiple access scheme to determine a signal from a particular remote user and to demodulate the determined signal.

The output of the timeslot processors 217 is demodulated burst data for each of the four receive timeslots. This data is sent to the host DSP processor 231 whose main function is to control all elements of the system and interface with the higher level processing, which is the processing which deals with what signals are required for communications in all the different control and service communication channels defined in the system's communication protocol. The host DSP 231 can be a Motorola 56300 Family DSP. In addition, timeslot processors send the determined receive weights for each user terminal to the host DSP 231. The host DSP 231 maintains state and timing information, receives uplink burst data from the timeslot processors 217, and programs the timeslot processors 217. In addition it decrypts, descrambles, checks error correcting code, and deconstructs bursts of the uplink signals, then formats the uplink signals to be sent for higher level processing in other parts of the base station. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 237. The host DSP also manages programming of other components of the base station including the transmit controller/modulator 237 and the RF timing controller shown as 233.

The RF timing controller 233 interfaces with the RF system, shown as block 245 and also produces a number of timing signals that are used by both the RF system and the modem. The RF controller 233 reads and transmits power monitoring and control values, controls the duplexer 107 and receives timing parameters and other settings for each burst from the host DSP 231.

The transmit controller/modulator 237, receives transmit data from the host DSP 231, four symbols at a time. The transmit controller uses this data to produce analog IF outputs which are sent to the RF transmitter (TX) modules 245. Specifically, the received data bits are converted into a complex modulated signal, up-converted to an IF frequency, 4-times over-sampled, multiplied by transmit weights obtained from host DSP 231, and converted via digital to analog converters ("DACs") which are part of transmit controller/modulator 237 to analog transmit waveforms. The analog waveforms are sent to the transmit modules 245.

The transmit modules 245 up-convert the signals to the transmission frequency and amplify the signals. The amplified transmission signal outputs are sent to antennas 103 via the duplexer/time switch 107.

User Terminal Structure

Figure 2:
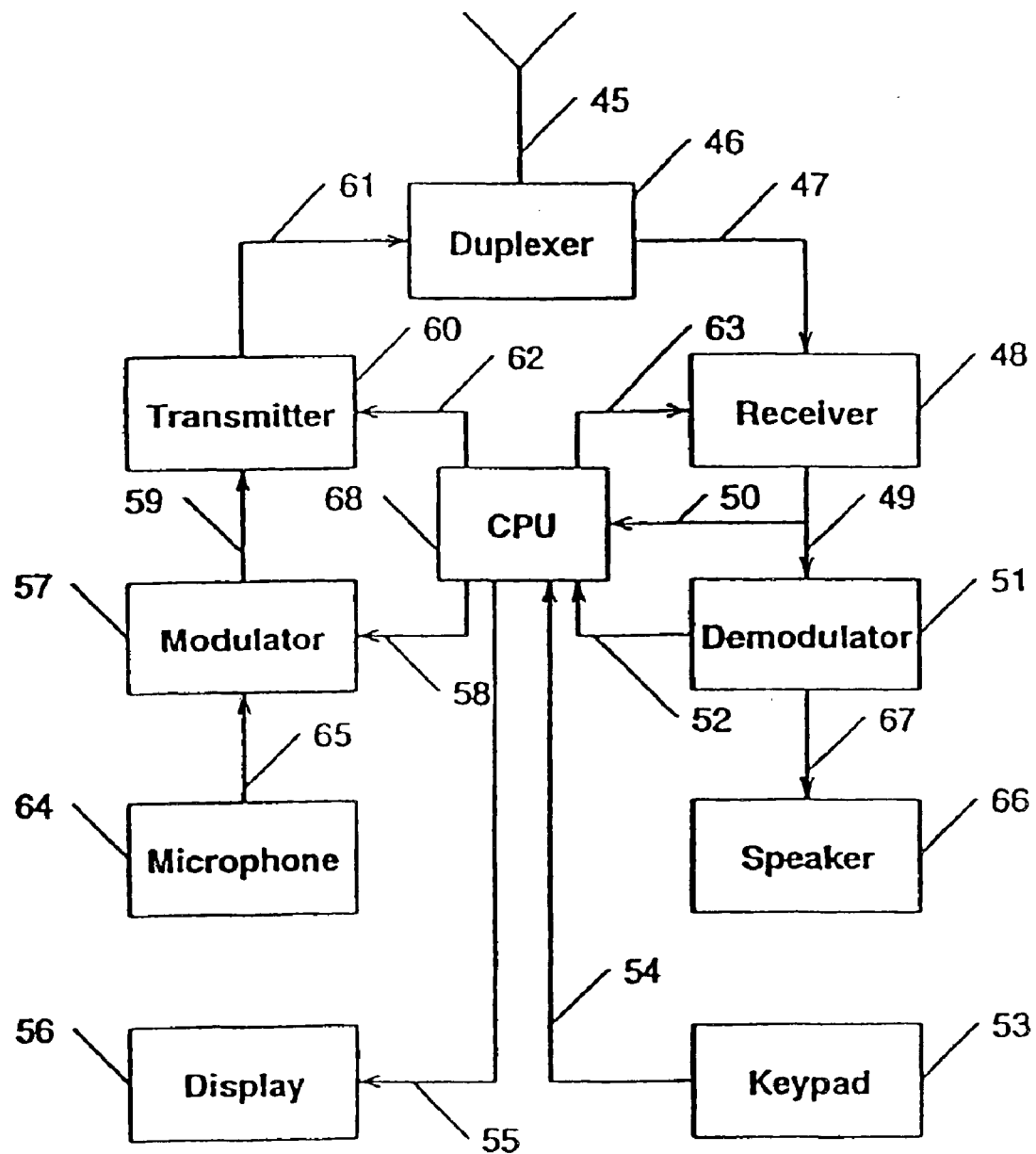
FIG. 2 is a block diagram of a remote terminal on which an embodiment of the invention can be implemented.

FIG. 2 depicts an example component arrangement in a remote terminal that provides data or voice communication. The remote terminal's antenna 45 is connected to a duplexer 46 to permit antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division diversity is used, a transmit/receive (TR) switch can be used instead of a duplexer as is well-known in the art. The duplexer output 47 serves as input to a receiver 48. The receiver 48 produces a down-converted signal 49 which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 66, respectively for a voice communications remote terminal. In another embodiment, the microphone and speaker are also in direct communication with the CPU to provide voice or data communications.

The remote terminal's voice signal to be transmitted 65 from the microphone 64 is input to a modulator 57. Traffic and control data to be transmitted 58 is supplied by the remote terminal's CPU 68. Control data 58 is transmitted to base stations during registration, session initiation and termination as well as during the session as described in greater detail below.

In an alternate embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

Training Sequences

In a typical communications system, such as the one described above, each uplink communication burst includes a training sequence for the base station to use in demodulating signals. The training sequences can function better if they have certain correlation properties. These properties would make different training sequences and multipath copies of transmitted training sequences easier to distinguish from the original transmitted training sequence. Training sequences are used in many other applications and for many other purposes, including downlink communications, among others. The invention is not limited to an uplink training sequence included in a data burst, but may be used any time a training sequence with desirable correlation properties is transmitted using a peak to average power constrained modulation format.

Any sequence of symbols, including a training sequence, when transmitted over a radio frequency can be modeled as having been processed by a pulse shape filter. The transmitted waveform takes on certain values in time depending on the signal transmitted with the pulse shape filter. For ease of understanding, a Binary Phase Shift Keying (BPSK or 2PSK) modulation format is considered; however, the following description is more generally applicable to other Phase Shift Keying (PSK) modulation formats and to other modulation formats that alter correlation properties of sequences when the sequences are transmitted. Mathematically, the waveform generated when transmitting a sequence a(k) can be represented as $$g(t) = \sum_k a_k \cdot p(t - kT)$$

where g(t) is the time-varying transmitted waveform,
$a_k$ is a sequence of symbols indexed by k,
T is the symbol period in units of time, and
p(t−kT) is the pulse shape of the transmitter filter.

Since 2PSK uses a symbol set of $\{1,-1\}$ the above time varying function g(t) will have zero-crossings, i.e. moments in time when g(t) crosses from positive to negative values, and vice versa. These zero crossings lower the average power of the signal, and thus increase the peak to average power ratio of the transmitted waveform. This is undesirable because the peak to average power ratio determines the distortions that a power amplifier will create due to its nonlinearities. For ease of understanding, zero crossings can also be pictured by following a straight path from 1 to −1 in the complex plane, where the complex plane is a two-dimensional plane with a horizontal and a vertical axis, such that the horizontal axis represents the real part of a complex number and the vertical axis represents the imaginary part of a complex number. Since 1 and −1 have no imaginary parts they are represented by the coordinates (1,0) and (−1,0) respectively, where the first element in the ordered pair represents distance on the horizontal axis and the second element represents distance on the vertical axis.

Therefore, the straight path from 1 to −1 would cross the origin. Thus transmitting two symbols 180 degrees, or π radians, out of phase using the above pulse shape filter would result in a zero crossing. Various modulation formats have been developed to eliminate or reduce zero crossings. Returning to the 2PSK example, if every other symbol to be transmitted were multiplied by exp(jπ/2), or rotated by 90 degrees, the above path would not cross the origin. At this point, it should be noted that the expression exp(x) is mathematical shorthand for the quantity $e^x$ where e is the base of the natural logarithm and x is the term in the parenthesis. This modulation format is known as π/2-2PSK. This same methodology for reducing zero crossings or increasing the average power of the transmitted waveform can be used with more complex peak to average power constrained PSK modulation formats. Some of these are represented as π/M-MPSK where M can be any integer value, usually a power of 2. The concept may also be applied to various other modulation formats.

One potential problem with such peak to average power constrained modulation formats is that they may impair, distort, or destroy the correlation properties of a training sequence. For example, a training sequence exposed to a π/2-2PSK modulation format has different correlations than the same training sequence modulated by a format without a peak to average power constraint, such as 2PSK. The present invention relates to a modified training sequence derived from an original training sequence. The original training sequence has desirable correlation properties, and is modified so that the modified training sequence has the same desirable properties if it is modulated using a peak to average power constrained modulation format that the original training sequence had.

Figure 3:
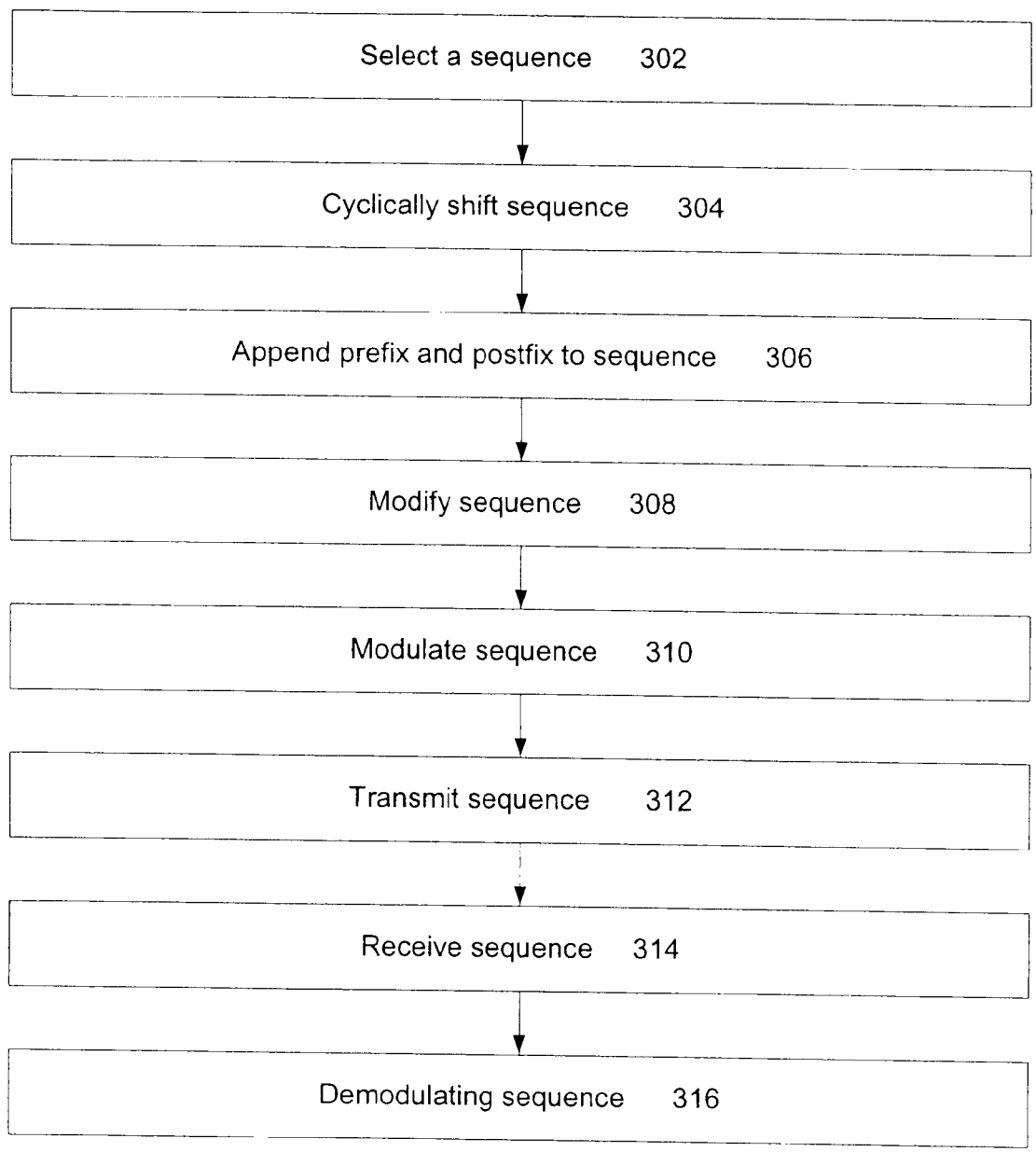
FIG. 3 is a flow chart of one method of generating and using modified training sequence in accordance with the present invention.

One method of generating the desired modified training sequences begins with selecting an original training sequence 302 (See FIG. 3). The original training sequence that is selected will be a sequence of complex numbers, or representations of complex numbers, which represent the phase differences in the modulated waveforms to be transmitted. This convention of representing waveforms of differing phases as constellation points in the complex plane is well known in the art. The sequence initially selected may only be representations of complex numbers that represent these waveforms. For example, a binary sequence, i.e. a sequence of 1s and 0s, could be selected, where 1 is assigned to the complex number 1+0j represented by the coordinates (1,0) in the complex plane, and 0 is assigned to the complex number −1+0j represented by the coordinates (−1,0) in the complex plane.

Thus, it is immaterial what representation is chosen for the sequence, the manipulations may be performed on binary symbols, complex numbers representing waveforms, vectors in the complex plane representing constellation points, or the waveforms themselves. At this point, for simplicity and ease of understanding, complex numbers are chosen. Each of these manipulations have analogous and identical counterparts for the other representations. Furthermore, vectors representations need not necessarily be in the complex plane, but any two-dimensional coordinate system. For mathematical convenience and communications traditions the complex plane is used. A specific example of performing the manipulations on binary symbols instead of complex numbers is given below.

Also discussed is how complex number manipulation relates to vector and phase manipulations.

Generally, the original training sequence is selected from a set of sequences designed to have good correlation properties. In one embodiment, the set of sequences from which the original training sequence is chosen has out-of-phase autocorrelations below some acceptable threshold value. The autocorrelation function is defined as:

$$R_{k,k}(\tau) = \sum_{t=0}^{N-1} S_k^*(t) \cdot S_k(t+\tau)$$

where N is the length of the sequence S, i.e. S has N elements,

S(t) is an element of S with index t, such that t ranges from 0 to N−1 inclusive, S*(t) is the complex conjugate of the element S(t), τ is the delay of the sequence, and in the term S(t+τ) the addition is performed modulo N.

For example, the autocorrelation of sequence $S_k=[a_0,a_1,a_2,a_3]$ delayed by 1 is $R_{k,k}(1)=a_0^* \cdot a_1 + a_1^* \cdot a_2 + a_2^* \cdot a_3 + a_3^* \cdot a_0$ Furthermore, all sequences in the set will have cross correlations with every other sequence in the set below some acceptable threshold value. The cross correlating function is defined as:

$$R_{k,j}(\tau) = \sum_{t=0}^{N-1} S_k^*(t) \cdot S_j(t-\tau)$$

where N is the length of the sequence S, i.e. S has N elements,

S(t) is an element of S with index t, such that t ranges from 0 to N−1 inclusive, $S_k$ and $S_j$ are two different sequences, S*(t) is the complex conjugate of the element S(t), τ is the delay of the sequence, and in the term S(t+τ) the addition is performed modulo N.

For example, the cross correlation of sequence $S_k=[a_0,a_1,a_2,a_3]$ with another sequence $Sj=[b_0,b_1,b_2,b_3]$ delayed by 1 is: $R_{k,j}(1)=a_0^* \cdot b_1 + a_1^* \cdot b_2 + a_2^* \cdot b_3 + a_3^* \cdot b_0$ The selection of the original training sequence from the set may be done at random, or according to some pattern. According to one embodiment, every sequence of the set is selected and modified according to the method described. If this is done, the modified training sequences are stored and the selection of the modified training sequence to be transmitted will occur between after modifying the sequence 308 and before modulating the sequence 310. Thus, the procedure of modifying the original training sequences, 302 to 308 need only be performed once, but modulating 310, transmitting 312, receiving 314, and demodulating 316 the modified training sequence included in a communication is repeated with each successive communication.

After an original training sequence is selected from the set of sequences with the desirable correlation properties some preparatory actions may be performed. These procedures are not necessary but can enhance certain results in some cases. For example, the original training sequence may be cyclically shifted 304 by some integer number. This is done, for example, to enable the reuse of the same original or modified training sequence among the many user terminals sharing a base station resource, such as a frequency band.

Furthermore, a prefix and a postfix may be appended to the original training sequence 306. In one embodiment, the prefix is made up of the last X elements of the original training sequence and the suffix comprises the first X elements of the sequence, where X can be any integer value less than the length of the sequence. This may be done, for example, to make the correlation functions be identical to the cyclic correlation of the sequence family.

After the original training sequence is in a desired form, it is modified to form a modified training sequence which will exhibit the correlation properties of the original training sequence if it is used by a peak to average power constrained modulation format. One feature of some peak to average power constrained modulation formats is that prior to modulation, every other complex number to be modulated is multiplied by exp(jπ/M) where $j^2=-1$, and M is some integer value, usually a power of two (2). This is identical to rotating a vector extending from the origin to the coordinates in the complex plane of the complex number by π/M radians, or 180/M degrees, in the complex plane. For example, a π/2-2PSK modulation format rotates every other such vector by π/2 radians, or 90 degrees, i.e. a quarter circle. As explained above, rotating a vector representing a symbol by a radian value R is equivalent mathematically to multiplying a complex number by exp(jR); therefore a π/2-2PSK modulation format multiplies every other complex number of a sequence by exp(jπ/2).

Since the complex numbers and vectors are themselves symbolic representations of phases of waveforms, rotating a complex number by R radians or D degrees can be thought of as shifting the phase of a waveform by R radians or D degrees at the symbol transmission. As noted above, there are many levels of abstraction on which the invention may be practiced.

The way the original training sequence is modified to compensate for the effect of the π/M-M-ary modulation format according to one embodiment is by forming a modifying sequence based on which the original training sequence will be modified. This periodic modifying sequence is formed by making the following sequence of complex numbers: [exp (j0π/M), exp(j0π/M), exp(j2π/M), exp(j2π/M), exp(j4π/M), exp(j4π/M) . . . ] The periodicity of this sequence follows from the fact that exp(j0π/M)=exp(j2Mπ/M). It also follows that the period of the modifying sequence will be twice the value of M. The ellipse indicates that the sequence increases in pairs. Each successive complex number pair is the previous complex number pair multiplied by exp(2π/M). This modifying sequence can also be thought of as a sequence of rotations or phase shifts where the angle of the rotation or shift increases by 2π/M, or 360/M degrees, in pairs.

Next, the original training sequence is multiplied with the modifying sequence elementwise, or put another way, the first element of the original training sequence is multiplied with the first element of the modifying sequence, the second element of the original training sequence with the second element of the modifying sequence, and so on, until the end of the original training sequence. Since the modifying sequence is periodic, it can be thought of as being the same length as the original training sequence it modifies, or alternatively it can be thought of as cyclic repetitions of itself. In either case, the modifying sequence will always be long enough to elementwise multiply the original training sequence.

The modifying sequence can also be thought of as comprising rotations. Since exp(j0π/M) is the same as a rotation by 0 radians, exp(j2π/M) the same as a rotation by 2π/M radians, and so on, the modifying sequence can be thought of as pairs of rotations increasing by one M-th rotation around a circle with each successive pair. Similarly, the modifying sequence may be thought of as a sequence of phase shifts, where multiplying by exp(j2π/M) is analogous to shifting the phase of a waveform by 2π/M radians.

The exact structure of the modifying sequence may vary. The essential element of the modifying sequence is that when multiplied with the original training sequence, the modified training sequence preserves the correlation properties of the original sequence when a rotator rotates every other element by π/M, i.e. multiplies every other element by exp(jπ/M).

It is not necessary in practical application to generate a set of modified training sequences from a set of original training sequences 302, 304, 306, 308 every time a modified training sequence needs to be transmitted. After the modified training sequences have been generated once, they may be stored in a number of ways. For example, the training sequences may be converted to binary symbols and stored digitally or in other storage mediums.

Once the modified training sequence is formed, or looked up from an earlier generated set as described above, the modified training sequence is modulated 310. Modulation is the process by which the symbols, e.g. complex numbers, that comprise the modified training sequence are converted to waveforms on a carrier wave, as is well-known in the art.

The modulated training sequence is next transmitted 312. Transmission involves sending the modulated waveform through some transmission medium. A great variety of transmission systems and formats well known in the art may be used when practicing the invention. In one embodiment, the modulated training sequence is sent from the user terminal to the base station in an uplink burst through radio frequencies. The modified training sequence may also be used for communication in any direction and in several transmission media.

Next, the base station, or similar receiving device, receives the signal containing the training sequence 314, and demodulates it 316 to get back the original symbols sent by the user terminal. The base station then uses the training sequence for synchronization and calibration purposes, such as computing spatial and temporal filter weights to reduce intersymbol interference and to increase the signal to noise ratio, among others.

2PSK Example

In one embodiment of the invention, the chosen peak to average power constrained modulation format is a π/2-2PSK modulation format. As described above, one aspect of a π/2-2PSK modulation format is that prior to modulation, every other element of the sequence is rotated by π/2 radians, or a quarter circle. Once again, this is the same as multiplying every other element of a sequence by exp(jπ/2), shifting the phase of a waveform by π/2, or as any other representation which may be employed.

Another aspect of the π/2-2PSK format, is that the original training sequence is a sequence of two (2) numbers, often represented by 1 and −1. Thus selecting an original training sequence 301 comprises choosing or generating a sequence of 1's and −1's, e.g. [1,1,1,−1,1,−1,−1,1]. If this sequence were to be cyclically shifted 304 by two (2) right shifts the sequence would now be [−1,1,1,1,1,−1,1,−1]. In one embodiment, a prefix and a suffix are appended to the sequence 306. By way of illustration, if the prefix and suffix were of length two (2), the prefix would be the last two elements of the sequence, i.e. 1 and −1, and the suffix would be the first two elements of the sequence, i.e. −1 and 1. The appended sequence would now be [1,−1,−1,1,1,1,1,−1,1,−1,1]. However, appending the prefix and suffix are optional procedures, not now performed for simplicity's sake. Thus the original training sequence selected is [1,1,1,−1,1,−1,−1,1].

This sequence can be regarded as a sequence of complex numbers whose the imaginary terms are zero. As previously noted, this is a mathematical representation identical to, e.g. the following sequence of phase shifts: [0,0,0,180,0,180,180,0], where the phase shifts are indicated in degrees.

Next, the original training sequence is modified 308. This is done by generating the modifying sequence, as described above, by starting with [exp(j0π/M), exp(j0π/M), exp(j2π/M), exp(j2π/M), exp(j4π/M), exp(j4π/M) . . . ] In this case, since π/2-2PSK is being used, M=2. Thus, the modifying sequence is [exp(j0π/2), exp(j0π/2), exp(j2π/2), exp(j2π/2), exp(j4π/2), exp(j4π/2, . . . ] This sequence is equivalent to [1,1−1,−1,1,1, . . . ], which is equivalent to (1,1,−1,−1), where the parentheses indicate that the sequence repeats. Once again, multiplying a number by 1 can be though of as a rotation of a vector by 0 radians in the complex plane, and multiplying a number by −1 can be thought of as a rotation by π radians in the complex plane. Furthermore, as discussed above, these rotations further represent phase shifts in the waveforms, and may be described in such a manner without loss of generality. Thus the above periodic sequence, (1,1,−1,−1) is equivalent to the periodic sequence (0,0, π,π) where the second sequence is given in radians and may be interpreted as either vector rotations or phase shifts by the angle given in radians. In degrees, the sequence would be represented as (0,0, 180,180).

Next, the original training sequence is multiplied elementwise with the periodic modifying sequence. Thus the modified training sequence will comprise
[1·1, 1·1, 1·−1, −1·−1, 1·1, −1·1, −1·−1, 1·−1], which equals [1,1,−1,1,1,−1,1,−1]. This sequence is then modulated. As part of the π/2-2PSK modulation format, every other complex number is multiplied by exp(jπ/2) prior to being transposed on a carrier wave. Thus, the actual sequence which is transmitted when the π/2-2PSK modulator is fed the modified training sequence is [1,j,−1,j,1,−j,1,−j].

This sequence has correlation properties identical to the original training sequence and also conforms to the peak to average power constraint when modulated. Note that transmitting the above sequence is identical to transmitting waveforms with phase shifts of [0,90,180,90,0,270,180,270], where the numbers represent degrees. After the π/2-2PSK modulator performs the rotation to arrive at the transmitted sequence above, this sequence is transmitted, received, and demodulated on the receive end to get back the symbols of the modified training sequence.

Binary Example

In another embodiment, the training sequence can be modified on the binary level. Suppose that a set of modified training sequences for a π/2-2PSK modulation format are to be generated from a set of sequences that had the desired correlation properties. In one embodiment, this set may be a family of Gold sequences, whose elements are 1's and −1's. The training sequence modifying process can then be performed on all sequences and the modified training sequences can be stored. The sequences can each be periodically shifted 304 and a prefix and a postfix can be appended 306 as described above.

An original training sequence of 1's and −1's is conveniently stored in binary form with 1's mapped to 1 and −1's mapped to 0. Thus, the sequence in the example above, [1,1,1,−1,1,−1,−1,1], can be stored in one byte as [11101001]. The modified training sequence may now be formed by performing a binary complement operation on every other pair of bits. The binary complement of a binary number, such as a bit, is the "opposite" number, i.e. the complement of 0 is 1, and the complement of 1 is 0 or in mathematical notation, 0'=1 and 1'=0. Thus the modified training sequence is [111'0'100'1']= [11011010].

It can be observed, that when we interpret this byte according to the mapping [11011010] corresponds to [1,1,−1,1,1,−1,1,−1]. This resulting modified training sequence is identical to the training sequence derived when complex multiplication was performed instead of binary operations. Accordingly, the invention can be practiced on several levels of abstraction and application with multiple modulation formats and implementations.

Efficient Storage Table

As discussed above, it is sometimes inefficient to generate a modified training sequence from an original training sequence as described above every time a modified training sequence is sent. Thus, a storage table is described from which modified training sequences can be read such that no further modifications prior to modulation of the training sequence are necessary. Instead, beginning with certain elements of a row of the storage table will have the same result as selecting an original training sequence, appending a prefix and a suffix, cyclically shifting this sequence by some integer value, and modifying this sequence by the modifying sequence as described in detail above.

The formation of this table is demonstrated by an example referring to Table 1 and Table 2. Table 1 has 32 rows—though only row 0 is given for convenience—of 63 binary symbols each, labeled $c_0$ to $c_{62}$, where each row represents an original training sequence, $c_k$. Table 2 has 32 rows of 123 binary symbols each, $b_0$ to $b_{122}$—though again only row 0 is given— and is an example of the efficient storage of the present invention if prefix and suffix lengths are 5 symbols each. This table is then stored on some data storage element in the base station of FIG. 1, the user terminal of FIG. 2, or any other external data storage element of the communication system.

These tables are given by way of example. Using similar methodology, storage tables of various dimensions and elements types may be constructed that further accommodate various prefix and postfix lengths and various modulation formats. The tables are not limited to binary symbols, which in this example are used with a π/2-2PSK modulation format. Any waveform representation discussed above is similarly suitable. Furthermore, while the sequences are shown as rows of a table a table data structure is not required any data structure is suitable. Typically the sequences will be stored in some sort of nonvolatile memory and can be ordered in any manner that allows the sequences to be accessed and read.

To generate the efficient storage table represented by Table 2 of modified extended training sequences, a table of original training sequences is created, such as the Table 1. Table 1 has 32 rows (0-31) with each row containing 63 binary symbols ($c_0$-$c_{62}$). Each row is an original training sequence. The original training sequences in Table 1 have desirable autocorrelation and cross correlation properties. As long as some desired property of the sequences is maintained, the table may have any number of rows, and each row, or original training sequence, may have any number of elements.

Starting with row 0, an extended sequence can be generated by starting with element $c_{58}$ and cyclically appending elements to the extended sequence in row 0 until the extended sequence has 123 elements. Thus, the extended sequence, called $a_k$, for example, appears as [$c_{58}$,$c_{59}$,$c_{60}$,$c_{61}$,$c_{62}$,$c_0$,$c_1$, $c_2$, . . . , $c_{54}$] containing 123 elements. In mathematical notation, the extended sequence is formed by:

$$a_k = c_{[(k+58) \bmod 63]} \text{ where } k \text{ ranges from 0 to 122 inclusive.}$$

The extended sequence may need to be longer depending on the length of the original training sequence. The length of the extended sequence can be at least the sum of the length of the training sequence ultimately transmitted and the largest cyclic shift to be accommodated. Thus, the extended sequence may be twice the length of the training sequence to be transmitted. In this specific example, since the original training sequences have 63 elements and the prefix and suffix lengths are 5 elements, the training sequence to be transmitted will have 73 elements. Thus the largest cyclic shift that the extended sequence $a_k$ above can accommodate using the process described above is 50, since 123 minus 50 equals 73.

Prefixes and suffixes or differing lenghts, as discussed above, can easily be appended by forming Table 2 differently. Starting at different points in Table 1 of the original training sequence when forming the extended sequence renders different prefix and suffix lengths. For example, starting with element $c_{53}$ will result in a 10 element prefix and a 10 element suffix, since the length of the prefix and suffix is the number of elements contained therein. As discussed further above, a prefix may be the terminal elements of an original training sequence, the suffix may be the initial elements of the original training sequence, and the prefix and suffix may be the same length. This is the case in this example.

Next, the binary complement operation is performed on the extended sequence $a_k$ in pairs as described above, i.e. every other pair of the elements of the extended sequence is replaced with its binary complement. Thus, in mathematical notation, the final sequence $b_k$ is defined elementwise as:

$$b_k = a_k \text{ if } (k \bmod 4) < 2; \text{ and}$$

$$b_k = a_k' \text{ otherwise;}$$

Where $a_k'$ is the binary complement of element $a_k$.

As explained above, this binary complement operation is specific to this binary example. If the elements of ak were represented as complex symbols, then every other pair of complex symbols would be multiplied by $\exp(\pi/M)$ where M is the integer value describing the π/M-MPSK modulation format, already discussed above.

The modified extended sequence bk thus represents the first row, row 0, of Table 2, the efficient storage table. Repeat-

TABLE 1

| $C_0$ ............................................................................................ $C_{62}$ |
|---|
| 0   111111010101100110111011010010011100010111100101000110000100000 |
| . |
| . |
| . |
| 31 | ing the above procedure for all other rows as well, in this example rows 1-31 (not shown), generates the remainder of Table 2.

TABLE 2

$b_0$ .................................................................................$b_{122}$ 0   0011010011011001111111101110100101111101000111000001101111110001001111 0011110110101010001000011110101111011011010110010101

.
.
.

31

Table 2 has 32 rows of 123 elements each. The table is very simple to use. When a modified training sequence is to be transmitted with a cyclic shift of an integer value L, a row from the efficient storage table is selected, for example row 0, and the 73 element modified training sequence to be transmitted will start with the element with index L of the selected row and include the next 72 elements in order. Thus the modified training sequence will appear as $[b_L, b_{L+1}, b_{L+2}, \ldots, b_{L+72}]$ with length 73.

In one embodiment, L can be 50 or less, otherwise 123 elements will not be enough, since 73 (the length of the modified training sequence to be transmitted) plus 50 (the element we start reading the modified training sequence from) equals 123. Starting with an element greater than 50 will result in the data reader running out of data to read as it encounter the end of the selected row, row 0 in this example. It is this training sequence which is ultimately transmitted using a peak to average power constrained modulation format, e.g. a $\pi/2$-2PSK modulation format in this binary example.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form.

The present invention includes various steps. The steps of the present invention may be performed by hardware components, such as those shown in FIGS. 1 and 2, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, any steps described as being performed by the base station may be performed by the user terminal and vice versa. The invention is equally applicable to systems in which terminals communicate with each other without either one being designated as a base station, a user terminal, a remote terminal or a subscriber station.

The present invention may be provided as a computer program product which may include a machine-readable medium having stored thereon instructions which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Importantly, while the present invention has been described in the context of a training sequence embedded in an uplink data burst in a wireless communication system, it can be applied to a wide variety of applications where synchronization, calibration, and other communications functions, e.g. beamforming, are accomplished by the use of training sequences. Training sequences are used in radio frequency communications in all directions and a variety of systems, thus the present invention applies to all such systems.

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

What is claimed is:

1. A method comprising:

selecting a set of one or more original ordered sequences the set of ordered sequences having at least one desired property;

creating a set of extended sequences, each based on an original ordered sequence by beginning with an element of an original sequence, cyclically appending elements of the original sequence in order to obtain a desired extended sequence length, and modifying each extended sequence using a corresponding modifying sequence, such that a training sequence can be generated from any one of the modified extended sequences by beginning with any one element of any one modified extended sequence and taking each element of the any one sequence in order to obtain the training sequence, the modifying sequence being selected so that the obtained training sequence when modulated by a selected modulation format has the at least one desired property of the corresponding original ordered sequence, wherein the training sequences reduce memory requirements in peak to average power constrained modulation formats in a radio frequency communication system.

2. The method of claim 1 wherein the desired extended sequence length is the length of the training sequence plus the number of the element of the modified extended sequence where the generation of the training sequence begins.

3. The method of claim 1, wherein the one desired property comprises a function of the autocorrelation of any original sequence in the set of original sequences being below a threshold value.

4. The method of claim 1 wherein the original ordered sequences have a cross-correlation property further comprising generating further training sequences from the any one sequence by beginning with other elements of the any one sequence and wherein the modifying sequence is selected so that the training sequence and the further training sequences when modulated by the selected modulation format have the cross-correlation property.

5. The method of claim 1, wherein the one desired property comprises a function of the cross-correlation of any original sequence in the set of original sequences with any other original sequence in the set of original training sequences being below a threshold value.

6. The method of claim 1, wherein the original sequence comprises a sequence of complex numbers corresponding to phase shifts employed by a modulation format used to transmit a training sequence.

7. The method of claim 1, wherein the modifying sequence comprises a sequence of complex numbers, and forming a modified extended sequence comprises multiplying each element of the extended sequence by a corresponding element of the modifying sequence.

8. The method of claim 7, wherein the modulation format is a $\pi/M$-MPSK modulation format.

9. The method of claim 8, wherein the modifying sequence comprises pairs of equal complex numbers, such that each complex number pair is equal to the previous complex number pair multiplied by $\exp(j2\pi/M)$.

10. The method of claim 1, wherein the modulation format is a $\pi/2$-2PSK modulation format.

11. The method of claim 10, wherein the original sequence comprises a sequence of binary symbols.

12. The method of claim 11, wherein the modifying sequence performs a binary complement operation on every other pair of elements of the extended sequence.

13. The method of claim 1, wherein selecting a set of original ordered sequences comprises selecting a family of Gold sequences.

14. An apparatus comprising:
a data store having stored therein a plurality of original ordered sequences for use in generating training sequences, the set of ordered sequences having at least one desired property, wherein a training sequence is generated by taking an element a number of elements of one of the plurality of original ordered sequences, cyclically appending elements of the original sequence in order to obtain a desired extended sequence length, modifying the extended sequence using a corresponding modifying sequence and beginning with any one element of the modified extended sequence taking each element of the sequence in order to obtain the training sequence, wherein the modifying sequence is selected so that the obtained training sequence has the at least one desired property of the corresponding original ordered sequence when used by a peak to average power constrained modulation format, wherein the training sequences reduce memory requirements in peak to average power constrained modulation formats in a radio frequency communication system.

15. The apparatus of claim 14, wherein the one desired property comprises a function of the autocorrelation of a training sequence being below a threshold value.

16. The apparatus of claim 14, wherein the one desired property comprises a function of the cross correlation of a training sequence with any other training sequence being below a threshold value.

17. The apparatus of claim 14, wherein the length of the plurality of ordered sequences is the length of the training sequence plus the index of the element of one of the plurality of training sequences which is the initial element of the training sequence.

* * * * *